United States Patent
Zhang et al.

(10) Patent No.: US 11,596,897 B2
(45) Date of Patent: Mar. 7, 2023

(54) METHOD FOR RECOVERING $CO_2$ IN THE RECTISOL PROCESS AND RECOVERY SYSTEM

(71) Applicant: Dalian Jiachun Gas Purification Technology Development Co., Ltd, Dalian (CN)

(72) Inventors: Shuwei Zhang, Dalian (CN); Fengbao Guan, Dalian (CN); Yan Li, Dalian (CN); Jin Zhao, Dalian (CN); Yaming Du, Dalian (CN); Ping Qu, Dalian (CN)

(73) Assignee: Dalian Jiachun Gas Purification Technology Development Co., Ltd, Dalian (CN)

( * ) Notice: Subject to any disclaimer, the term of this patent is extended or adjusted under 35 U.S.C. 154(b) by 268 days.

(21) Appl. No.: 16/867,860

(22) Filed: May 6, 2020

(65) Prior Publication Data
US 2021/0106943 A1 Apr. 15, 2021

(30) Foreign Application Priority Data
Mar. 8, 2019 (CN) .......................... 201910174590.2

(51) Int. Cl.
*B01D 53/14* (2006.01)
*B01D 3/06* (2006.01)
*B01D 3/10* (2006.01)

(52) U.S. Cl.
CPC ........... *B01D 53/1475* (2013.01); *B01D 3/06* (2013.01); *B01D 3/10* (2013.01); *B01D 2252/2021* (2013.01); *B01D 2257/304* (2013.01)

(58) Field of Classification Search
CPC ............ B01D 53/14; B01D 3/06; B01D 3/10; B01D 53/1475; B01D 2252/2021; B01D 2257/304
See application file for complete search history.

(56) References Cited

U.S. PATENT DOCUMENTS 4,889,541 A * 12/1989 Beaupre ............... B01D 53/228
95/46

FOREIGN PATENT DOCUMENTS

| CN | 1451602 A | * 10/2003 | ............ B01D 53/14 |
| CN | 1451602 A | 10/2003 | |

(Continued)

OTHER PUBLICATIONS

CN103756734A_English (Year: 2014).*
CN1451602A_English (Year: 2003).*

*Primary Examiner* — Youngsul Jeong
(74) *Attorney, Agent, or Firm* — Maier & Maier, PLLC

(57) ABSTRACT

A method for recovering $CO_2$ in the Rectisol process. The method includes at least the following steps: performing reduced-pressure flash distillation treatment on the $CO_2$-rich methanol liquid, and outputting the $CO_2$ desorbed gas obtained after the reduced-pressure flash distillation treatment as a product gas; performing heat exchange flash distillation treatment on a first methanol treatment liquid obtained after the reduced-pressure flash distillation treatment, and outputting the $CO_2$ desorbed gas obtained after the heat exchange flash distillation treatment as a product gas; performing vacuum flash distillation treatment on a second methanol treatment liquid obtained after the heat exchange flash distillation treatment, and outputting the $CO_2$ desorbed gas obtained after the vacuum flash distillation treatment as a product gas. Reduced-pressure flash distillation treatment, heat exchange flash distillation treatment and vacuum flash (Continued)

distillation treatment are sequentially performed on the $CO_2$-rich methanol liquid in this method.

8 Claims, 2 Drawing Sheets

(56) References Cited

FOREIGN PATENT DOCUMENTS

| CN | 103756734 A | * | 4/2014 | ............... C10K 1/16 |
| CN | 103756734 A | | 4/2014 | |

* cited by examiner

METHOD FOR RECOVERING CO$_2$ IN THE RECTISOL PROCESS AND RECOVERY SYSTEM

FIELD

The present application relates to a method for recovering CO$_2$ in the Rectisol process and recovery system, and belongs to the field of gas purification.

BACKGROUND

Rectisol process (low-temperature methanol washing process) is a gas purification process using physical absorption method. In this process, low-temperature methanol is used as a solvent to remove acid gas from the feed gas. Rectisol purification process can remove various components such as H$_2$S, COS, RSH, CO$_2$, HCN, NH$_3$, NO, paraffin hydrocarbons, aromatic hydrocarbons, crude gas oil and the like in the feed gas.

When the Rectisol process is used for absorbing components such as H$_2$S, CO$_2$ and the like in the feed gas, the CO$_2$ dissolved in the methanol liquid needs to be desorbed, because the CO$_2$ in the methanol-rich liquid is flashed out at a low-temperature and low-pressure, and a large amount of cooling capacity is generated due to the heat absorption in the desorption process, so that the heat emitted when the CO$_2$ in the feed gas is absorbed by the methanol liquid under the high pressure can be balanced, thereby ensuring the balance of the cold energy in the system. Therefore, the CO$_2$ in the methanol-rich liquid is fully desorbed in the low-temperature zone, so that the minimum cold consumption of the whole device can be ensured. In the prior art, in order to ensure that CO$_2$ is fully desorbed in the low-temperature zone, the methanol-rich liquid needs to be stripped, that is, the methanol-rich liquid is stripped with low-pressure nitrogen. For example, a process for absorbing and recovering the acidic gas CO$_2$ in the mixed gas by using methanol is disclosed in the CN1451602A. The process comprises the following steps: absorbing CO$_2$ with methanol, carrying out reduced pressure desorption, carrying out vacuum desorption, stripping and heating so as to separate CO$_2$.

In the process, the nitrogen consumption is relatively high, and meanwhile the nitrogen content in the CO$_2$ gas stripped is high. The CO$_2$ gas can no longer be used as product gas, and can only be discharged to the atmosphere as exhaust gas. The recovery rate of pure CO$_2$ product gas can only be about 83%, the CO$_2$ yield in certain devices does not meet the downstream production requirement, and meanwhile the CO$_2$ that has not been recovered also increases greenhouse gas emissions and causes pollution to the environment.

SUMMARY

According to one aspect of the present application, a method for recovering CO$_2$ in the Rectisol process is provided. In this method, reduced-pressure flash distillation treatment, heat exchange flash distillation treatment and vacuum flash distillation treatment are sequentially performed on the CO$_2$-rich methanol liquid. The method omits the step of stripping the methanol-rich liquid with low-pressure nitrogen, simplifies the CO$_2$ recovery process, no tail gas emissions, no low-pressure nitrogen consumption, and the recovery rate of CO$_2$ reaches more than 90%.

A method for recovering CO$_2$ in the Rectisol process, which comprises at least the following steps:

performing reduced-pressure flash distillation treatment on the CO$_2$-rich methanol liquid, and outputting the CO$_2$ desorbed gas obtained after the reduced-pressure flash distillation treatment as a product gas;

performing heat exchange flash distillation treatment on a first methanol treatment liquid obtained after the reduced-pressure flash distillation treatment, and outputting the CO$_2$ desorbed gas obtained after the heat exchange flash distillation treatment as a product gas;

performing vacuum flash distillation treatment on a second methanol treatment liquid obtained after the heat exchange flash distillation treatment, and outputting the CO$_2$ desorbed gas obtained after the vacuum flash distillation treatment as a product gas. It is noted that "first (or second) methanol treatment liquid" and "first (or second) methanol liquid" are interchangeable terminologies.

Optionally, the CO$_2$-rich methanol liquid comprises a CO$_2$-rich sulfur-free methanol liquid and a CO$_2$-rich sulfur-containing methanol liquid, and the reduced-pressure flash distillation treatments are performed on the sulfur-free methanol liquid and the sulfur-containing methanol liquid, respectively.

Optionally, the method further comprises removing H$_2$S in the CO$_2$ desorbed gas obtained by performing the reduced-pressure flash distillation treatment on the sulfur-containing methanol liquid, and outputting the CO$_2$ desorbed gas obtained after removing the H$_2$S as a product gas.

Optionally, the first methanol treatment liquid of the sulfur-free methanol liquid is used for washing the CO$_2$ desorbed gas obtained after the reduced-pressure flash distillation treatment on the sulfur-containing methanol liquid, so that the H$_2$S in the CO$_2$ desorbed gas is absorbed by the first methanol treatment liquid of the sulfur-free methanol liquid.

Optionally, heat exchange flash distillation treatment is performed on the first methanol treatment liquid obtained after the reduced-pressure flash distillation treatment on the sulfur-free methanol liquid and the sulfur-containing methanol liquid.

Optionally, the second methanol treatment liquid obtained after the heat exchange flash distillation treatment is passed into a vacuum desorption tank, and the flash pressure of the vacuum desorption tank is controlled, so that the CO$_2$ in the second methanol treatment liquid is fully desorbed.

Optionally, the CO$_2$ desorbed gas obtained after the vacuum flash distillation treatment is output as a product gas after being heat-exchanged treatment and washed with the first methanol treatment liquid of the sulfur-free methanol liquid.

Optionally, the method further comprises sending a remaining methanol liquid obtained after the vacuum flash distillation treatment to a thermal regeneration system so as to perform regeneration treatment on the remaining methanol liquid.

According to another aspect of the present application, a recovery system for implementing the method for recovering CO$_2$ in the Rectisol process described above is also provided. The recovery system comprises a CO$_2$ desorber used for performing the reduced-pressure flash distillation treatment on the CO$_2$-rich methanol liquid;

a first heat exchanger communicated with the CO$_2$ desorber for performing the heat exchange flash distillation treatment on the methanol liquid obtained after the reduced-pressure flash distillation treatment; and a vacuum desorption tank communicated with the CO$_2$ desorber for performing the vacuum flash distillation treatment on the methanol liquid obtained after the heat exchange flash distillation treatment.

Optionally, the $CO_2$ desorber comprises an upper section, a middle section and a lower section;

the upper section of the $CO_2$ desorber is used for performing the reduced-pressure flash distillation treatment on the sulfur-free methanol liquid in the $CO_2$-rich methanol liquid;

the middle section of the $CO_2$ desorber is used for performing the reduced-pressure flash distillation treatment on the sulfur-containing methanol liquid in the $CO_2$-rich methanol liquid;

the liquid inlet end of the first heat exchanger is communicated with the lower part of the middle section of the $CO_2$ desorber, and the liquid outlet end of the first heat exchanger is communicated with the upper part of the lower section of the $CO_2$ desorber.

Optionally, the liquid inlet of the vacuum desorption tank is communicated with the bottom of the lower section of the $CO_2$ desorber, and the air outlet of the vacuum desorption tank is communicated with the middle section of the $CO_2$ desorber through a vacuum pump, so that the desorbed gas generated in the vacuum desorption tank is discharged as a product gas through the $CO_2$ desorber.

The beneficial effects that the present applicant brought out include:

1) According to the method for recovering $CO_2$ in the Rectisol process provided by the present application, by sequentially performing reduced-pressure flash distillation treatment, heat exchange flash distillation treatment, and vacuum flash distillation treatment on the $CO_2$-rich methanol liquid, the $CO_2$ dissolved in the methanol liquid is gradually desorbed and the recovery rate of $CO_2$ reaches about 90%.

2) According to the method for recovering $CO_2$ in the Rectisol process provided by the present application, the step of stripping with nitrogen is eliminated, low-pressure nitrogen consumption is avoided, no tail gas is discharged, energy is saved, and the environment is protected.

3) According to the recovery system for recovering $CO_2$ in the Rectisol process provided by the present application, the structure of $CO_2$ desorber is simplified, the $CO_2$ stripping structure is omitted, so that the structure of the recovery system is simple and the $CO_2$ recovery process is short, which is favorable to improve the recovery efficiency.

DETAILED DESCRIPTION

The present application will be described in detail below with reference to the embodiments, but the present application is not limited to these embodiments.

Figure 1:
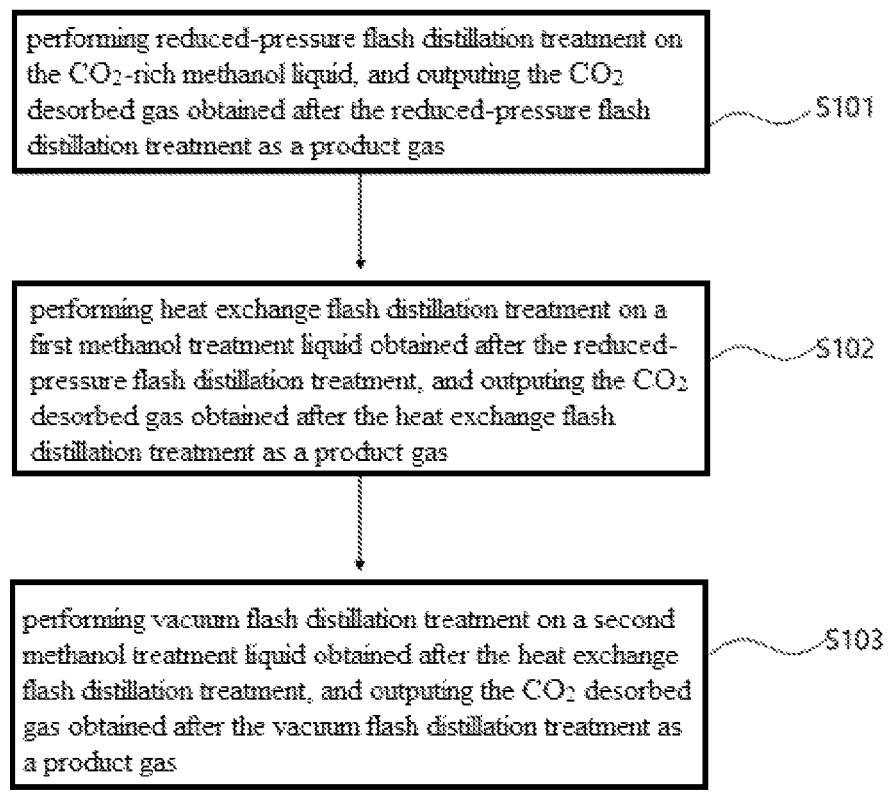
FIG. 1 is a flow chart of the method for recovering $CO_2$ in the Rectisol process, provided in Example 1.

FIG. 1 is a flow chart of the method for recovering $CO_2$ in the Rectisol process according to the embodiment. The embodiment is described in detail below with reference to FIG. 1.

As shown in FIG. 1, the embodiment provides a method for recovering $CO_2$ in the Rectisol process, comprising at least the following steps:

S101: performing reduced-pressure flash distillation treatment on the $CO_2$-rich methanol liquid, and outputting the $CO_2$ desorbed gas obtained after the reduced-pressure flash distillation treatment as a product gas;

S102: performing heat exchange flash distillation treatment on a first methanol treatment liquid obtained after the reduced-pressure flash distillation treatment, and outputting the $CO_2$ desorbed gas obtained after the heat exchange flash distillation treatment as a product gas;

S103: performing vacuum flash distillation treatment on a second methanol treatment liquid obtained after the heat exchange flash distillation treatment, and outputting the $CO_2$ desorbed gas obtained after the vacuum flash distillation treatment as a product gas.

In this embodiment, the $CO_2$-rich methanol liquid is sequentially subjected to reduced-pressure flash distillation treatment, heat exchange flash distillation treatment and vacuum flash distillation treatment, so that the $CO_2$ dissolved in the methanol liquid is gradually desorbed and the recovery rate of $CO_2$ reaches about 95%. Most of the $CO_2$ dissolved in the methanol liquid is desorbed by reduced-pressure flash distillation treatment and heat exchange flash distillation treatment, and then further desorbed by vacuum flash distillation treatment, and thus full desorption of $CO_2$ is realized. In the recovery method provided in this embodiment, a high nitrogen dioxide recovery rate can be ensured without designing a nitrogen stripping step. Therefore, there is no low-pressure nitrogen consumption and no tail gas emissions, saving energy and protecting the environment.

Optionally, the $CO_2$-rich methanol liquid comprises a $CO_2$-rich sulfur-free methanol liquid and a $CO_2$-rich sulfur-containing methanol liquid, and the sulfur-free methanol liquid and the sulfur-containing methanol liquid are performed the reduced-pressure flash distillation treatment, respectively.

In a Rectisol device, two steams of methanol-rich liquid are obtained after washing the feed gas with methanol, which are a $CO_2$-rich sulfur-free methanol liquid and a $CO_2$-rich sulfur-containing methanol liquid.

Before performing the reduced-pressure flash distillation treatment on the sulfur-free methanol liquid and the sulfur-containing methanol liquid, medium-pressure flash distillation treatment on the sulfur-free methanol liquid and the sulfur-containing methanol liquid is also included to recover the effective gas.

The reduced-pressure flash distillation treatments on the sulfur-free methanol liquid and the sulfur-containing methanol liquid obtained after the medium-pressure flash distillation treatments are performed, respectively.

The $CO_2$-desorbed gas obtained after the reduced-pressure flash distillation treatment on the sulfur-free methanol liquid can be directly output as a product gas. The first methanol treatment liquid obtained after the reduced-pressure flash distillation treatment on the sulfur-free methanol liquid can be subjected to heat exchange flash distillation treatment, or one part of the first methanol treatment liquid can be subjected to heat exchange flash distillation treatment, and the other part can be sent back to the washing device as a semi-lean solution used for washing the feed gas.

Optionally, the method further comprises removing $H_2S$ in the $CO_2$ desorbed gas obtained by performing the reduced-pressure flash distillation treatment on the sulfur-containing methanol liquid, and outputting the $CO_2$ desorbed gas after removing the $H_2S$ as the product gas.

The $CO_2$ desorbed gas obtained after the reduced-pressure flash distillation treatment on the sulfur-containing methanol liquid contains $H_2S$, which needs to be removed. After the $H_2S$ is removed, the $CO_2$ desorbed gas is output as the product gas.

Preferably, the first methanol treatment liquid of sulfur-free methanol liquid is used to remove the $H_2S$ obtained by the reduced-pressure flash distillation treatment on the sulfur-containing methanol liquid. Specifically, the first methanol treatment liquid of the sulfur-free methanol liquid is used for washing the $CO_2$ desorbed gas obtained after the reduced-pressure flash distillation treatment on the sulfur-containing methanol liquid, so that the $H_2S$ in the $CO_2$ desorbed gas is absorbed by the first methanol treatment liquid of the sulfur-free methanol liquid.

In the process, the first methanol treatment liquid of the sulfur-free methanol liquid is used to adsorb the $H_2S$ obtained by the reduced-pressure flash distillation treatment on the sulfur-containing methanol liquid, that is, the $H_2S$ is adsorbed by using the ready-made solution, so that the first methanol treatment liquid is effectively utilized, and the $H_2S$ adsorption solution that needs to be additionally prepared is also eliminated.

Optionally, the first methanol treatment liquid obtained after the reduced-pressure flash distillation treatment on the sulfur-free methanol liquid and the sulfur-containing methanol liquid, is performed heat exchange flash distillation treatment. For example, the first methanol treatment liquid of sulfur-free methanol liquid after absorbing $H_2S$ is subjected to heat exchange flash distillation treatment together with the first methanol treatment liquid of sulfur-containing methanol liquid.

Specifically, the first methanol treatment liquid may be passed into a first heat exchanger which is used to perform the heat exchange flash distillation treatment on the first methanol treatment liquid. The $CO_2$ desorbed gas obtained after the heat exchange flash distillation treatment can be directly output as the product gas.

Optionally, the second methanol treatment liquid obtained after the heat exchange flash distillation treatment is passed into a vacuum desorption tank, and the flash pressure of the vacuum desorption tank is controlled, so that the $CO_2$ in the second methanol treatment liquid is fully desorbed.

Specifically, the flash pressure in the vacuum desorption tank is controlled to be reduced to atmospheric pressure or to a certain degree of vacuum.

Optionally, the $CO_2$ desorbed gas obtained after the vacuum flash distillation treatment is output as the product gas after being heat-exchanged and washed with the first methanol treatment liquid of the sulfur-free methanol liquid.

Specifically, the $CO_2$ desorbed gas obtained after the vacuum flash distillation treatment on the second methanol treatment liquid is subjected to heating, pressure rise and cooling treatment, and then is output as the product gas after being washed with the first methanol treatment liquid obtained after the reduced-pressure flash distillation treatment on the sulfur-free methanol liquid.

Optionally, the method further comprises sending a remaining methanol liquid obtained after the vacuum flash distillation treatment to a thermal regeneration system so as to perform regeneration treatment on the remaining methanol liquid. The remaining methanol liquid obtained after the vacuum flash distillation treatment is the sulfur-containing methanol solution, and the content of $CO_2$ in the methanol solution is very low, and regeneration treatment can be performed directly.

Figure 2:
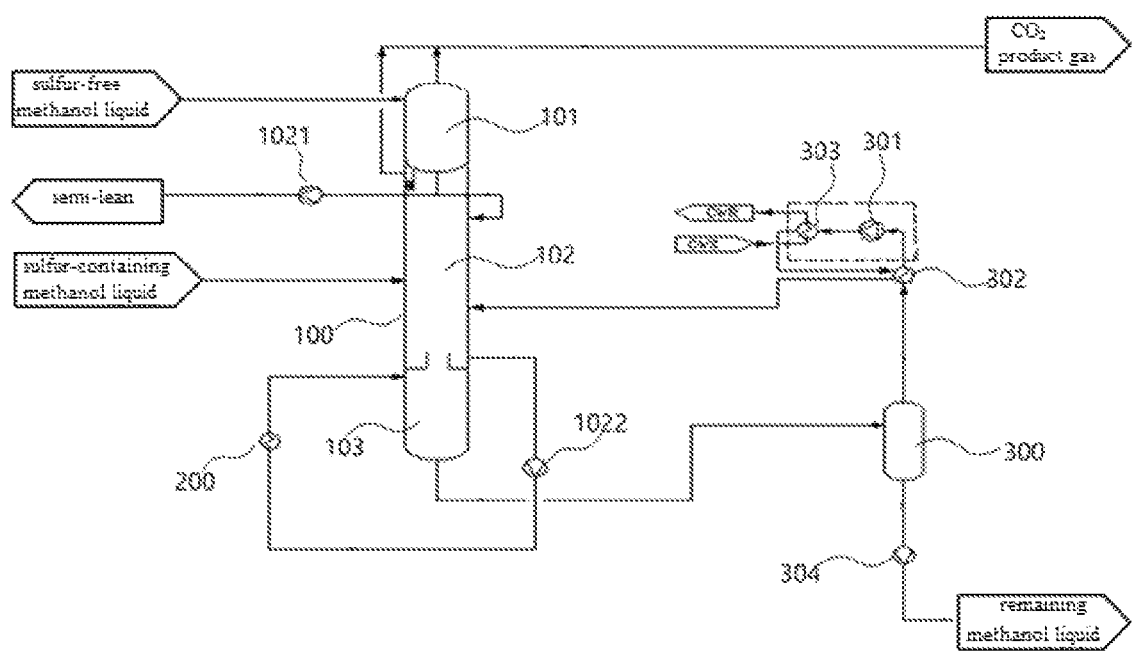
FIG. 2 is a schematic diagram of the structure of the recovery system for implementing the method for recovering $CO_2$ in the Rectisol process, provided in Example 1.

This embodiment provides a recovery system for implementing the method for recovering $CO_2$ in the Rectisol process in Example 1. FIG. 2 is a schematic diagram of the structure of the recovery system provided in this embodiment. The embodiment is described in detail below with reference to FIG. 2.

The recovery system provided in this embodiment comprises a $CO_2$ desorber 100, a first heat exchanger 200 and a vacuum desorption tank 300.

The $CO_2$ desorber 100 is used for performing the reduced-pressure flash distillation treatment on the $CO_2$-rich methanol liquid.

The first heat exchanger 200 is communicated with the $CO_2$ desorber 100 for performing the heat exchange flash distillation treatment on the methanol liquid obtained after the reduced-pressure flash distillation treatment.

The vacuum desorption tank 300 communicated with the $CO_2$ desorber 100 for performing the vacuum flash distillation treatment on the methanol liquid obtained after the heat exchange flash distillation treatment.

According to the recovery system for recovering $CO_2$ in the Rectisol process provided by this embodiment, the structure of $CO_2$ desorber is simplified, the $CO_2$ stripping structure is omitted, so that the structure of the recovery system is simple and the $CO_2$ recovery process is short, which are favorable to improve the recovery efficiency.

Optionally, as shown in FIG. 2, the $CO_2$ desorber 100 comprises an upper section 101, a middle section 102 and a lower section 103.

The upper section 101 of the $CO_2$ desorber 100 is used for performing the reduced-pressure flash distillation treatment on the sulfur-free methanol liquid in the $CO_2$-rich methanol liquid.

The middle section 102 of the $CO_2$ desorber 100 is used for performing the reduced-pressure flash distillation treatment on the sulfur-containing methanol liquid in the $CO_2$-rich methanol liquid.

The liquid inlet end of the first heat exchanger 200 is communicated with the lower part of the middle section 102 of the $CO_2$ desorber 100, and the liquid outlet end of the first heat exchanger 200 is communicated with the upper part of the lower section 103 of the $CO_2$ desorber 100.

Optionally, with continued reference to FIG. 2, the liquid inlet of the vacuum desorption tank 300 is communicated with the bottom of the lower section of the $CO_2$ desorber 100, and the air outlet of the vacuum desorption tank 300 is communicated with the middle section 102 of the $CO_2$ desorber 100 through a vacuum pump 301, so that the desorbed gas generated in the vacuum desorption tank 300 is discharged as product gas through the $CO_2$ desorber 100.

The second heat exchanger 302 is installed between the air outlet of the vacuum desorption tank 300 and one end of the vacuum pump 301 for heating the $CO_2$ desorbed gas output from the vacuum desorption tank 300, and the other end of the vacuum pump 301 is communicated with the third heat exchanger 303 for cooling treatment of the $CO_2$ desorbed gas. The third heat exchanger 303 is communicated with the second heat exchanger 302. The second heat exchanger 302 is also used for secondary cooling treatment of the $CO_2$ desorbed gas.

The bottom of the vacuum desorption tank 300 is provided with a liquid outlet, which is used for sending the remaining methanol liquid obtained after the vacuum flash distillation treatment to the thermal regeneration system to perform regeneration treatment on the remaining methanol liquid.

The method for recovering $CO_2$ in the Rectisol process is specifically described below with reference to the schematic diagram of the structure of the recovery system shown in FIG. 2.

The sulfur-free methanol liquid enters the upper section 101 of the $CO_2$ desorber 100. After the reduced-pressure flash distillation treatment, the resulting $CO_2$ desorbed gas is directly output from the top of the upper section 101 as product gas. A part of the first methanol treatment liquid obtained by the reduced-pressure flash distillation treatment on the sulfur-free methanol liquid using the first infusion pump 1021 is sent back to the washing device as a semi-lean solution used for washing the feed gas. The other part of the first methanol treatment liquid enters the upper part of the middle section 102 of the $CO_2$ desorber 100.

The sulfur-containing methanol liquid enters the middle section 102 of the $CO_2$ desorber 100. After the reduced-pressure flash distillation treatment, the resulting $CO_2$ desorbed gas (containing $H_2S$) is washed with the first methanol treatment liquid of the sulfur-free methanol liquid which enters the upper part of the middle section 102 of the $CO_2$ desorber 100, and then is discharged as product gas. While the first methanol treatment liquid of sulfur-free methanol liquid after absorbing $H_2S$ flows into the bottom of the middle section 102. The first methanol treatment liquid obtained after the reduced-pressure flash distillation treatment on sulfur-containing methanol liquid also flows into the bottom of the middle section 102.

The first methanol treatment liquid at the bottom of the middle section 102 of the $CO_2$ desorber 100 is pumped into the first heat exchanger 200 by the second infusion pump 1022, and the temperature of the first methanol treatment liquid after treating by the first heat exchanger 200 rises so that a part of $CO_2$ will be desorbed again. The $CO_2$ desorbed by heat exchange enters the middle section 102 from the upper part of the lower section 103 of the $CO_2$ desorber 100 and is directly discharged as product gas. The second methanol treatment liquid obtained after heat exchange enters the bottom of the lower section 103 of the $CO_2$ desorber 100.

The second methanol treatment liquid at the bottom of the lower section 103 of the $CO_2$ desorber 100 enters the vacuum desorption tank 300 through the liquid inlet at the upper part of the vacuum desorption tank 300. Under the action of the vacuum pump 301, the second methanol treatment liquid is vacuum desorbed. The $CO_2$ vacuum desorbed gas is heated by the second heat exchanger 302 and then enters the vacuum pump 301. At this moment, the vacuum pump 301 is used for boosting the $CO_2$ vacuum desorbed gas. Then the $CO_2$ vacuum desorbed gas enters the middle section 102 of the $CO_2$ desorber 100 after being cooled by the third heat exchanger 303 and the second heat exchanger 302, and is output as a product gas.

The remaining methanol liquid obtained after the vacuum flash distillation treatment is located at the bottom of the vacuum desorption tank 300, and is sent to the thermal regeneration system under the action of the third infusion pump 304 to perform regeneration treatment on the remaining methanol liquid.

Example 1: $CO_2$ Recovery Rate Test

Test Method:

The feed shift gas (13174.38 kmol/h, $CO_2$ content 41.66% mol) was washed in the scrubber, and then the $CO_2$ in the feed gas was dissolved in the methanol liquid to obtain the $CO_2$-rich sulfur-free methanol liquid and the $CO_2$-rich sulfur-containing methanol liquid.

The $CO_2$-rich sulfur-free methanol liquid was passed into the upper section 101 of the $CO_2$ desorber for the reduced-pressure flash distillation treatment, in which the $CO_2$ content in the sulfur-free methanol liquid was about 27% mol. The specific condition of the reduced-pressure flash distillation was that the flash pressure was 0.19 MPaG, and the $CO_2$ desorbed gas obtained by the reduced-pressure flash distillation was collected. One part of the first methanol treatment liquid obtained after the reduced-pressure flash distillation treatment on the sulfur-free methanol liquid was returned as a semi-lean solution to the scrubber, while the other part entered the upper part of the middle section 102 of the $CO_2$ desorber 100.

The $CO_2$-rich sulfur-containing methanol liquid was passed into the middle section 102 of the $CO_2$ desorber 100 for the reduced-pressure flash distillation treatment, and was washed with the first methanol treatment liquid of sulfur-free methanol liquid to remove $H_2S$ in the desorbed gas, wherein the $CO_2$ content in the sulfur-containing methanol liquid was about 27% mol. The specific condition of the reduced-pressure flash distillation was that the flash pressure was 0.23 MPaG, and the $CO_2$ desorbed gas obtained by the reduced-pressure flash distillation was collected.

The first methanol treatment liquids of the sulfur-free methanol liquid and sulfur-containing methanol liquid obtained after the reduced-pressure flash distillation treatment were passed into the first heat exchanger 200. The specific conditions of heat exchange were: the low temperature methanol-rich liquid (that is, the first methanol treatment liquid with a temperature of −55° C. to −60° C.) obtained after the reduced-pressure flash distillation was heated to −30° C.

The methanol-rich liquid (i.e. the first methanol treatment liquid) with increased temperature after the heat exchange treatment will have a part of $CO_2$ desorbed at lower section 103, and the remaining liquid will form the second methanol treatment liquid.

The second methanol treatment liquid obtained after the heat exchange flash distillation was passed into the vacuum desorption tank 300 for vacuum desorption, and the vacuum degree in the vacuum desorption tank 300 was-0.01 MPaG. The cooling capacity for the $CO_2$ vacuum desorbed gas obtained after the vacuum desorption was recovered through the compressor inlet and outlet heat exchangers, and the pressure was increased to 0.23 MPaG. The $CO_2$ vacuum desorbed gas was then passed into the middle section 102 of the $CO_2$ desorber 100 and washed with the first methanol treatment liquid of the sulfur-free methanol liquid, and then the $CO_2$ vacuum desorbed gas was collected.

Test Results:

The total amount of $CO_2$ in the Rectisol feed gas was:

M=13174.38 kmol/h×41.66% mol=5488.447 kmol/h;

The amount of the $CO_2$ desorbed gas by the Rectisol process was 5349.47 kmol/h, wherein the concentration of $CO_2$ was 99.5204% mol, and the total amount of recovered $CO_2$ was:

M=5349.47 kmol/h×99.5204% mol=5323.814 kmol/h;

The recovery rate of $CO_2$ was therefore calculated as:

m÷M=97%.

The above are only a few examples of the present application, and are not intended to limit the present application in any way. Although the present application is disclosed in the above with preferred example, it is not intended to limit the present application. Any one skilled in the art can understand that other changes and modifications by using the above technical content without departing from the scope of the technical solution of the present application are equivalent to equivalent embodiments and belong to the scope of the technical solution.

What is claimed is:

1. A method for recovering $CO_2$ in the Rectisol process, comprising:
   performing reduced-pressure flash distillation treatment on a $CO_2$-rich methanol liquid, and outputting $CO_2$ desorbed gas obtained after the reduced-pressure flash distillation treatment as a product gas, wherein the $CO_2$-rich methanol liquid comprises a sulfur-free methanol liquid and a sulfur-containing methanol liquid;
   performing heat exchange flash distillation treatment on a first methanol liquid obtained after the reduced-pressure flash distillation treatment, and outputting $CO_2$ desorbed gas obtained after the heat exchange flash distillation treatment as a product gas; and
   performing vacuum flash distillation treatment on a second methanol liquid obtained after the heat exchange flash distillation treatment, and outputting $CO_2$ desorbed gas obtained after the vacuum flash distillation treatment as a product gas;
   wherein a recovery system for implementing the method for recovering $CO_2$ in the Rectisol process is provided, the recovery system comprising:
      a $CO_2$ desorber used for performing the reduced-pressure flash distillation treatment on the $CO_2$-rich methanol liquid;
      a first heat exchanger communicated with the $CO_2$ desorber for performing the heat exchange flash distillation treatment on the first methanol liquid obtained after the reduced-pressure flash distillation treatment; and
      a vacuum desorption tank communicated with the $CO_2$ desorber for performing the vacuum flash distillation treatment on the second methanol liquid obtained after the heat exchange flash distillation treatment;
   wherein the $CO_2$ desorber comprises an upper section, a middle section and a lower section;
   the upper section of the $CO_2$ desorber is used for performing the reduced-pressure flash distillation treatment on the sulfur-free methanol liquid in the $CO_2$-rich methanol liquid;
   the middle section of the $CO_2$ desorber is used for performing the reduced-pressure flash distillation treatment on the sulfur-containing methanol liquid in the $CO_2$-rich methanol liquid; and
   a liquid inlet end of the first heat exchanger is communicated with the lower part of the middle section of the $CO_2$ desorber, and a liquid outlet end of the first heat exchanger is communicated with the upper part of the lower section of the $CO_2$ desorber.

2. The method for recovering $CO_2$ in the Rectisol process of claim 1, wherein the $CO_2$-rich methanol liquid comprises a $CO_2$-rich sulfur-free methanol liquid and a $CO_2$-rich sulfur-containing methanol liquid, and the reduced-pressure flash distillation treatments are performed on the $CO_2$-rich sulfur-free methanol liquid and the $CO_2$-rich sulfur-containing methanol liquid respectively.

3. The method for recovering $CO_2$ in the Rectisol process of claim 2, further comprising removing $H_2S$ in $CO_2$ desorbed gas obtained by performing the reduced-pressure flash distillation treatment on the $CO_2$-rich sulfur-containing methanol liquid, and outputting the $CO_2$ desorbed gas obtained after removing the $H_2S$ as a product gas.

4. The method for recovering $CO_2$ in the Rectisol process of claim 3, wherein a first methanol liquid of the $CO_2$-rich sulfur-free methanol liquid obtained after the reduced-pressure flash distillation treatment is used for washing the $CO_2$ desorbed gas obtained after the reduced-pressure flash distillation treatment on the $CO_2$-rich sulfur-containing methanol liquid, so that the $H_2S$ in the $CO_2$ desorbed gas is absorbed by the first methanol liquid of the $CO_2$-rich sulfur-free methanol liquid.

5. The method for recovering $CO_2$ in the Rectisol process of claim 2, wherein the heat exchange flash distillation treatment is performed on the first methanol liquid obtained after the reduced-pressure flash distillation treatment on the $CO_2$-rich sulfur-free methanol liquid and the $CO_2$-rich sulfur-containing methanol liquid.

6. The method for recovering $CO_2$ in the Rectisol process of claim 5, wherein the second methanol liquid obtained after the heat exchange flash distillation treatment is passed into a vacuum desorption tank, and flash pressure of the vacuum desorption tank is controlled, so that the $CO_2$ in the second methanol liquid is fully desorbed.

7. The method for recovering $CO_2$ in the Rectisol process of claim 6, wherein the $CO_2$ desorbed gas obtained after the vacuum flash distillation treatment is outputted as a product gas after heat-exchanged treatment and being washed with the first methanol liquid of the $CO_2$-rich sulfur-free methanol liquid.

8. The method for recovering $CO_2$ in the Rectisol process of claim 1, wherein a liquid inlet of the vacuum desorption tank is communicated with the bottom of the lower section of the $CO_2$ desorber, and an air outlet of the vacuum desorption tank is communicated with the middle section of the $CO_2$ desorber through a vacuum pump, so that the desorbed gas generated in the vacuum desorption tank is discharged as a product gas through the $CO_2$ desorber.

* * * * *